(12) United States Patent
Kennedy et al.

(10) Patent No.: US 7,594,272 B1
(45) Date of Patent: Sep. 22, 2009

(54) DETECTING MALICIOUS SOFTWARE THROUGH FILE GROUP BEHAVIOR

(75) Inventors: Mark Kennedy, Redondo Beach, CA (US); David Kane, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 767 days.

(21) Appl. No.: 10/959,484

(22) Filed: Oct. 5, 2004

(51) Int. Cl.
*G06F 11/00* (2006.01)
*G06F 12/14* (2006.01)
*G06F 21/00* (2006.01)
*G06F 1/00* (2006.01)
*H04L 29/06* (2006.01)

(52) U.S. Cl. .............. 726/24; 726/22; 726/23; 713/187; 713/188

(58) Field of Classification Search ......... 726/24, 726/22; 713/187, 188
See application file for complete search history.

(56) References Cited

U.S. PATENT DOCUMENTS

| | | | | |
|---|---|---|---|---|
| 7,448,084 | B1 * | 11/2008 | Apap et al. | 726/24 |
| 2002/0194490 | A1 * | 12/2002 | Halperin et al. | 713/200 |
| 2005/0039082 | A1 * | 2/2005 | Nachenberg | 713/38 |

FOREIGN PATENT DOCUMENTS

EP 1971102 A1 * 9/2008

OTHER PUBLICATIONS

Joseph Tucek, James Newsome, Shan Lu, Chengdu Huang, Spiros Xanthos, David Brumley, Yuanyuan Zhou, Dawn Song, "Sweeper: a lightweight end-to-end system for defending against fast worms", Jun. 2007, EuroSys '07: Proceedings of the 2nd ACM SIGOPS/EuroSys European Conference on Computer Systems 2007, Publisher: ACM, pp. 115-128.*

Delio, M., "Virus Throttle a Hopeful Defense", Wired News, Dec. 9, 2002 [online] Retrieved from the Internet <URL:http://www.wired.com/news/infostructure/0,1377,56753,000.html>.

Lowe, R. et al., WinXP Pro File Sharing, Practically Networked, Dec. 12, 2001, [online] [Retrieved on Jun. 10, 2003] Retrieved from the Internet <URL:http//www.practicallynetworked.com/sharing/xp_filesharing/whole.htm>.

Microsoft web pages, "Microsoft Palladium: A Business Overview," pp. 1-10 [online], Amy Carroll, Mario Juarez, Julia Polk and Tony Leininger, Aug. 2002 [retrieved on Oct. 10, 2002]. Retrieved from the Internet: <URL:http://www.microsoft.com/PressPass/features/2002/jul02/0724palladiumwp.asp>.

(Continued)

*Primary Examiner*—Matthew B Smithers
*Assistant Examiner*—Courtney D Fields
(74) *Attorney, Agent, or Firm*—Fenwick & West LLP

(57) ABSTRACT

A malicious software detection module (MSDM) detects worms and other malicious software. The MSDM executes on a computer system connected to a network. The MSDM monitors a storage device of the computer system for the arrival of software from a suspicious portal. The MSDM designates such software as suspicious. The MSDM tracks the set of files that are associated with the suspicious software. If the files in the set individually or collectively engage in suspicious behavior, the MSDM declares the suspicious software malicious and prevents file replication and/or other malicious behavior.

21 Claims, 4 Drawing Sheets

OTHER PUBLICATIONS

Microsoft web pages, "Microsoft Palladium Initiative—Technical FAQ," pp. 1-8 [online], Aug. 2002 [retrieved in Oct. 10, 2002]. Retrieved from the Internet: <URL:http://www.microsoft.com/technet/security/news/PallFAQ2.asp?frame=true>.

Moore, D. et al., Code-Red: A Case Study On The Spread And Victims Of An Internet Worm, Proceedings of the Internet Measurement Workshop (IMW), 2002, [online] [Retrieved on Dec. 16, 2003] Retrieved from the Internet <URL:http://www.citeseer.nj.nec.com/moore02codered.hmtl>.

New Windows Worms At Work In May web page, Shout Communications, [online] [Retrieved on Dec. 16, 2003 ] Retrieved from the Internet <URL:http://www.shoutasia.com/trend/clients_trend_may_virus.htm>.

Parkhouse, Jayne, "Pelican SafeTNet 2.0" [online], Jun. 2000, SC Magazine Product Review, [retrieved on Dec. 1, 2003]. Retrieved from the Internet: <URL:http://www.scmagazine.com/scmagazine/standalone/pelican/sc_pelican.html>.

Staniford, S. et al., How To Own The Internet In Your Spare Time, Proceedings of the 11the USENIX Security Symposium, 2002, [online] [Retrieved on Dec. 16, 2003] Retrieved from the Internet <URL://http://citeseer.nj.nec.com/staniford02how.html>.

Toth, T. et al., Connection-History Based Anomaly Detection, Proceedings of the 2002 IEEE, Workshop On Information Assurance And Security, Jun. 2002, pp. 30-35. vol. 17-19, United States Military Academy, West Point, N.Y.

Trusted Computing Platform Alliance, "Building a Foundation of Trust in the PC," pp. 1-9, Jan. 2000.

Trusted Computing Platform Alliance web pages. "TCPA / Palladium Frequently Asked Questions," pp. 1-13 [online], Ross Anderson [retrieved on Oct. 10, 2002]. Retrieved from the Internet: <URL:http://www.cl.cam.ac.uk/~rja14/tcpa-faq.html>.

Williamson, M., "Throttling Viruses: Restricting Propagation to Defeat Malicious Mobile Code", ACSAC Conference, Dec. 2002, pp. 1-9, Hewlett-Packard, Dec. 10, 2002.

Windows XP Simple File Sharing web page, Practically Networked, [online] [Retrieved on Jun. 10, 2003] Retrieved from the Internet <URL:http://www.practicallynetworked.com/sharing/xp/filesharing.htm>.

* cited by examiner

DETECTING MALICIOUS SOFTWARE THROUGH FILE GROUP BEHAVIOR

BACKGROUND OF THE INVENTION

1. Field of the Invention

This invention pertains in general to computer security and in particular to detection a computer worm and/or other type of malicious software.

2. Description of the Related Art

A "worm" is a type of malicious software that attempts to infect multiple computer systems. There are a number of ways a worm can initially execute on a computer system. For example, an end-user might unintentionally download the worm from the Internet as a parasitic virus attached to a program. Alternatively, a worm might infect the computer system using transmission media such as email scripts, buffer overflow attacks, password cracking, etc.

Typically, the primary purpose of a worm is to spread to other computer systems. The worm accomplishes this feat by installing versions of itself on the other computer systems. A successful worm spreads rapidly and can quickly damage many computer systems. A worm can also include functionality to infect files on its host computer system, destroy data on the computer system, and/or perform other malicious actions.

One technique for preventing attacks by worms, computer viruses, Trojan horses, and other types of malicious software to install security software on the computer system. However, it is sometimes not practical to use security software on certain computer systems. Moreover, security software might fail to detect previously unknown malicious software. In addition, certain types of malicious software use programming techniques, such as polymorphism or metamorphism, that hamper the effectiveness of security software.

Accordingly, there is a need in the art for a way to detect and block worms and other types of malicious software that does not suffer the drawbacks of current security software.

BRIEF SUMMARY OF THE INVENTION

The above need is met by a malicious software detection module (MSDM) that detects worms and other malicious software. The MSDM executes on a computer system connected to a network. The MSDM monitors a storage device of the computer system for the arrival of software from a suspicious portal. The MSDM designates such software as suspicious. The MSDM tracks the set of files that are associated with the suspicious software. If the files in the set individually or collectively engage in suspicious behavior, the MSDM declares the suspicious software malicious and prevents file replication and/or other malicious behavior.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
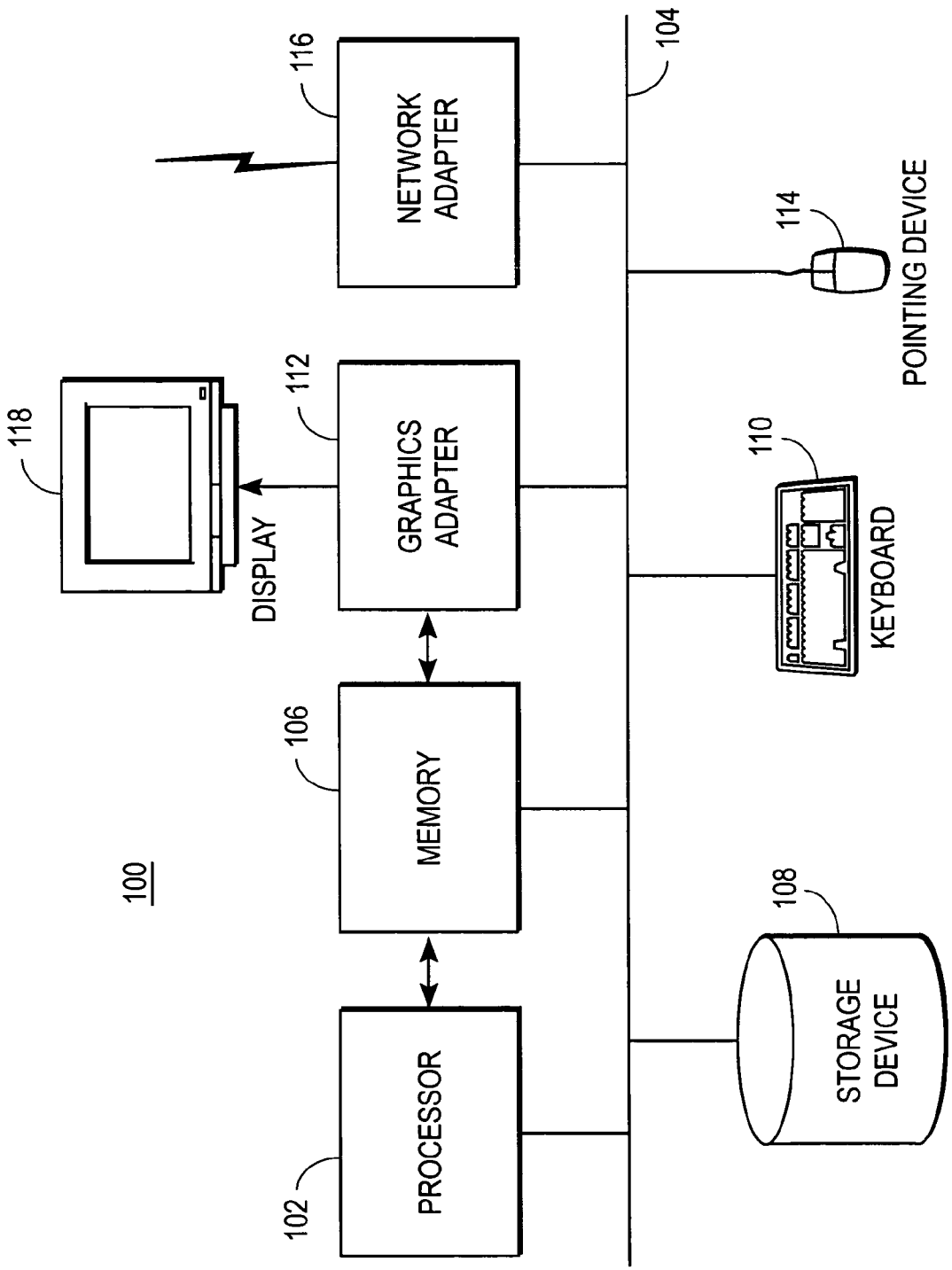
FIG. 1 is a high-level block diagram illustrating a functional view of a typical computer system for use with the present invention.

FIG. 1 is a high-level block diagram illustrating a functional view of a typical computer system 100 according to one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Different types of computer systems may lack one or more of the components described above.

The processor 102 is a general-purpose processor such as an INTEL x86, SUN MICROSYSTEMS SPARC, or POWERPC compatible-CPU. The memory 106 is, for example, firmware, read-only memory (ROM), non-volatile random access memory (NVRAM), and/or RAM, and holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to a network 210.

The storage device 108 is a hard disk drive and/or another device capable of storing data, such as a compact disk (CD), DVD, or solid-state memory device. As is known in the art, the storage device 108 holds executable programs and data in logical constructs called "files." A software program can be formed from one or more files, and likewise can access data stored in one or more other files. Depending upon the file system utilized on the storage device 108, each file can also have one or more stored attributes describing the file. For example, the stored attributes can indicate the name of the file, the date on which the file was last modified, the number of times the file was accessed, the entity that created, accessed or last modified the file, etc. Some file systems support extensible attributes.

As is known in the art, the computer system 100 is adapted to execute computer program modules. As used herein, the term "module" refers to computer program logic for providing the specified functionality. A module can be implemented in hardware, firmware, and/or software. In one embodiment, the modules are stored on the storage device 108. When utilized, the modules are loaded into the memory 106 and executed by the processor 102.

Figure 2:
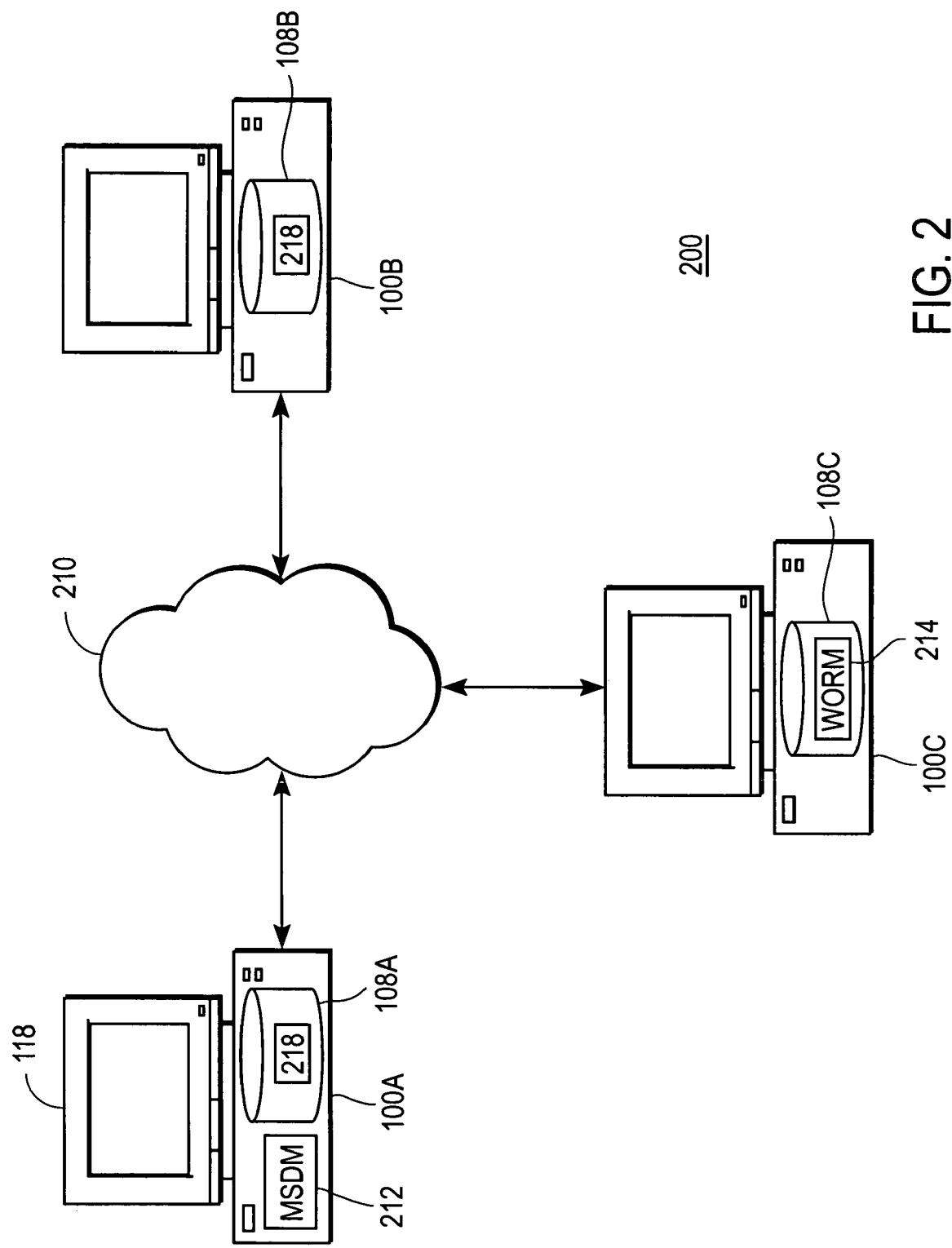
FIG. 2 is a high-level block diagram illustrating a typical computing environment.

FIG. 2 is a high-level block diagram illustrating a typical computing environment 200. The illustrated environment 200 has multiple computer systems 100 in communication via a conventional computer network 210. Each computer system 100 in FIG. 2 has a storage device 108. Although only three computer systems 100 are shown in FIG. 2, environments can have hundreds, or thousands, of computer systems coupled to the network 210. The network 210 can include a local area network and/or a wide area network such as the Internet.

FIG. 2 and the other figures use like reference numerals to identify like elements. A letter after a reference numeral, such as "100A," indicates that the text refers specifically to the element having that particular reference numeral. A reference numeral in the text without a following letter, such as "100," refers to any or all of the elements in the figures bearing that reference numeral (e.g. "100" in the text refers to reference numerals "100A," "100B," and/or "100C" in the figures).

In the environment 200 of FIG. 2, computer system 100A is executing a malicious software detection module (MSDM) 212 for detecting worms and other malicious software. In one embodiment, the MSDM 212 is implemented as a stand-alone program. In another embodiment, the MSDM 212 is part of a program for providing additional functionality. For example, the MSDM 212 can be embodied in program modules that operate to provide the computer system 100A with comprehensive protection from myriad threats. In addition, the MSDM 212 can be integrated into the operating system of the computer system 100A.

In one embodiment, the computer system 100A is configured to execute the MSDM 212 at all times while the computer is running. The MSDM 212 can be, for example, executed as a file system driver, as a WINDOWS service, as a software daemon, as an application program, etc. In one embodiment, the MSDM 212 is implemented at the network stack level where it can monitor inter-computer communications.

In the environment of FIG. 2, computer system 100C is executing a worm 214 or other malicious software that is attempting to infect other computer systems on the network 210. There are multiple ways that the worm 214 might have started executing on computer system 100C. For example, the worm 214 could be a Trojan horse program that executed surreptitiously when the end-user launched another program. Or, the worm 214 might have compromised the computer system 100C through a buffer overflow attack or another attack that allowed the worm to execute itself on the computer system 100C.

The worm 214 on computer system 100C uses the network 210 to create an instance of itself on the storage device 108A of computer system 100A. The new instance of the worm 216, in turn, attempts to create a third instance of the worm 218 on the storage device 108B of computer system 100B. However, the MSDM 212 executing on computer system 100A detects the presence of the worm 216 and, in one embodiment, blocks it from creating the third instance 218.

Figure 3:
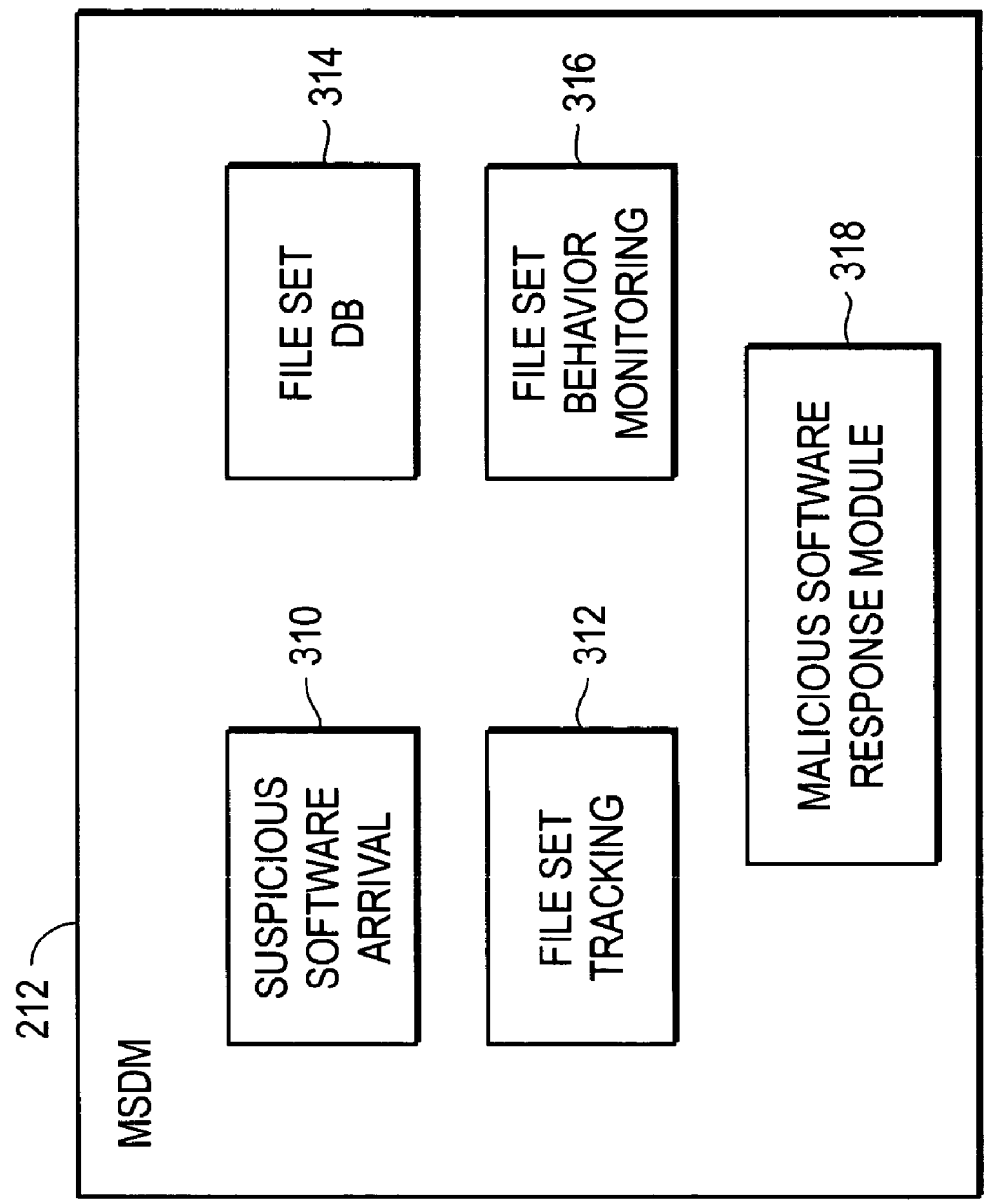
FIG. 3 is a high-level block diagram illustrated the modules within the MSDM according to one embodiment.

FIG. 3 is a high-level block diagram illustrated the modules within the MSDM 212 according to one embodiment. Other embodiments can have different and/or other modules than the ones illustrated in FIG. 3. In addition, the functionalities can be distributed among the modules in different ways in different embodiments.

A suspicious software arrival module 310 monitors the storage device 108 and detects the arrival of new software. Software can arrive on the storage device 108 via one or more entry points, or "portals." In one embodiment, potential portals include open drive shares and/or remote procedure calls from another computer system 100 on the network 210, via email, and/or downloaded from a network via HTTP, FTP, or another technique. In addition, specific network ports on the computer system 100 can be portals. Likewise, removable media readers on the computer system 100 can also be portals. In one embodiment, the installation program that is used to install software is a portal, and different installation programs represent different portals.

In one embodiment, the suspicious software arrival module 310 designates certain portals as suspicious. In one embodiment, portals connected to untrusted sources are designated suspicious. For example, in one embodiment the open drive share portal and HTTP portals are both considered suspicious because the entities that send software through those portals are potentially anonymous and not trustworthy. In contrast, the removable media reader portal is not suspicious because software received from removable media (especially read-only media) is typically trustworthy. In some embodiments, the suspicious software arrival module 310 uses other criteria to designate a portal as suspicious.

The suspicious software arrival module 310 designates software that arrives from suspicious portals as "suspicious." In one embodiment, each file that arrives from a suspicious portal is treated as separate suspicious software. In another embodiment, the suspicious software arrival module 310 groups certain files together as the same suspicious software. For example, files received within a certain time interval or from a same source can be treated as belonging to the same suspicious software. In one embodiment, only certain types of files, such as executable files, are designated as suspicious software. In one embodiment, the suspicious software arrival module 310 excepts some software from suspicion. For example, the module 310 can treat digitally-signed software as not suspicious.

A file set tracking module 312 maintains a set of files for each suspicious software. In one embodiment, the tracking module 312 creates a separate set for each software designated as suspicious. The set includes each file that constitutes the suspicious software. In addition, the tracking module 312 tracks the behaviors of the files in the set and records each time a file in the set "touches" another file on the storage device 108 or elsewhere in the computer system 100. In one embodiment, to "touch" means to create, modify, and/or read a file. In another embodiment, "touch" refers to fewer and/or more actions. For example, "touching" can include only creating and modifying an executable file and/or a file over a specified size. In addition, "touching" can be performed through indirect actions such as launching another process that then touches a file. The file set tracking module 312 adds the touched file to the set of the file that touched it.

In one embodiment, the tracking module 312 does not add programs caused to be executed by a suspicious program to the set of suspicious files. However, the tracking module 312 adds any files created or modified by the executed programs to the set. For example, if a suspicious program, sus-a.exe, runs a non-suspicious program, cmd.exe, and cmd.exe creates a new file, sus-b.exe, then cmd.exe is not added to the set of suspicious files but sus-b.exe is added to the set. In another example, assume sus-a.exe runs explorer.exe (a non-suspicious program) which in turn runs cmd.exe. Then, cmd.exe creates sus-b.exe. In this example, sus-b.exe is added to the set of suspicious files but neither explorer.exe nor cmd.exe are added to the set.

A file set database 314 persistently stores the file sets identified by the file set tracking module 312. The number of sets in the database 314 can vary depending upon the embodiment and/or the amount of software added to the particular computer system 100. The file set monitoring module 312 updates the data within the file set database 314 to reflect any activity by the suspicious software being monitored. As used herein, the term "database" refers to an information store and does not imply that the data within the "database" is organized in a particular structure beyond that described herein. In one embodiment, all or some of the data of the file set database 314 are stored in attributes associated with the files being monitored. For example, a file's attributes can indicate that it is a member of a particular file set and/or associated with particular suspicious software. In such an embodiment, there need not be a centralized database of file sets.

A file set behavior monitoring module 316 monitors the behaviors of the files within the set associated with each suspicious software. In one embodiment, the file set behavior monitoring module 316 evaluates the behaviors of the files both individually (i.e., tracks the behavior of each file in the set) and collectively (i.e., tracks the collective actions of the files in the set).

The file set behavior monitoring module 316 employs one or more heuristics to determine whether the suspicious software represented by each set is malicious. Each heuristic describes one or more conditions that, if satisfied, indicate that the software is malicious. A heuristic is satisfied if any file in the software's set fulfills the conditions of the heuristic, and/or the collective actions of the files in the set fulfill the conditions of the heuristic.

The heuristics that are utilized depend upon the specific embodiment. In one embodiment, a heuristic is designed to detect a computer worm infection like that illustrated in FIG. 2. According to this heuristic, software is malicious if it attempts to copy itself to another computer system via a technique such as email and/or an open drive share. The heuristic is satisfied if a file in a set attempts to send a copy of itself and/or any other file in the same set to the other computer system. Thus, the heuristic detects if a worm attempts to spread by copying itself and/or a file created or modified by the worm to another computer system.

Another heuristic specifies that software that sends more than a certain number of emails (e.g., N=10) within a certain time period is malicious. The file set behavior monitoring module 316 finds this heuristic satisfied if any file in a set sends more than the specified number of emails, and/or if the files in the set collectively send more than N emails within the time period. Other heuristics specify that software is malicious if it mines files on its local computer system for email addresses, performs certain network activities such as enumerating for open file shares and/or copying files, makes registry changes related to the persistency of the software, etc.

In one embodiment, a malicious software response module 318 performs one or more actions in response the detection of malicious software by the file set behavior monitoring module 316. Depending upon the embodiment, possible actions can include performing secondary tests on the software to determine whether it is truly malicious, providing an alert to an end-user of the computer system 100, quarantining the software, preventing the software from performing certain actions (such as replicating itself), etc.

Figure 4:
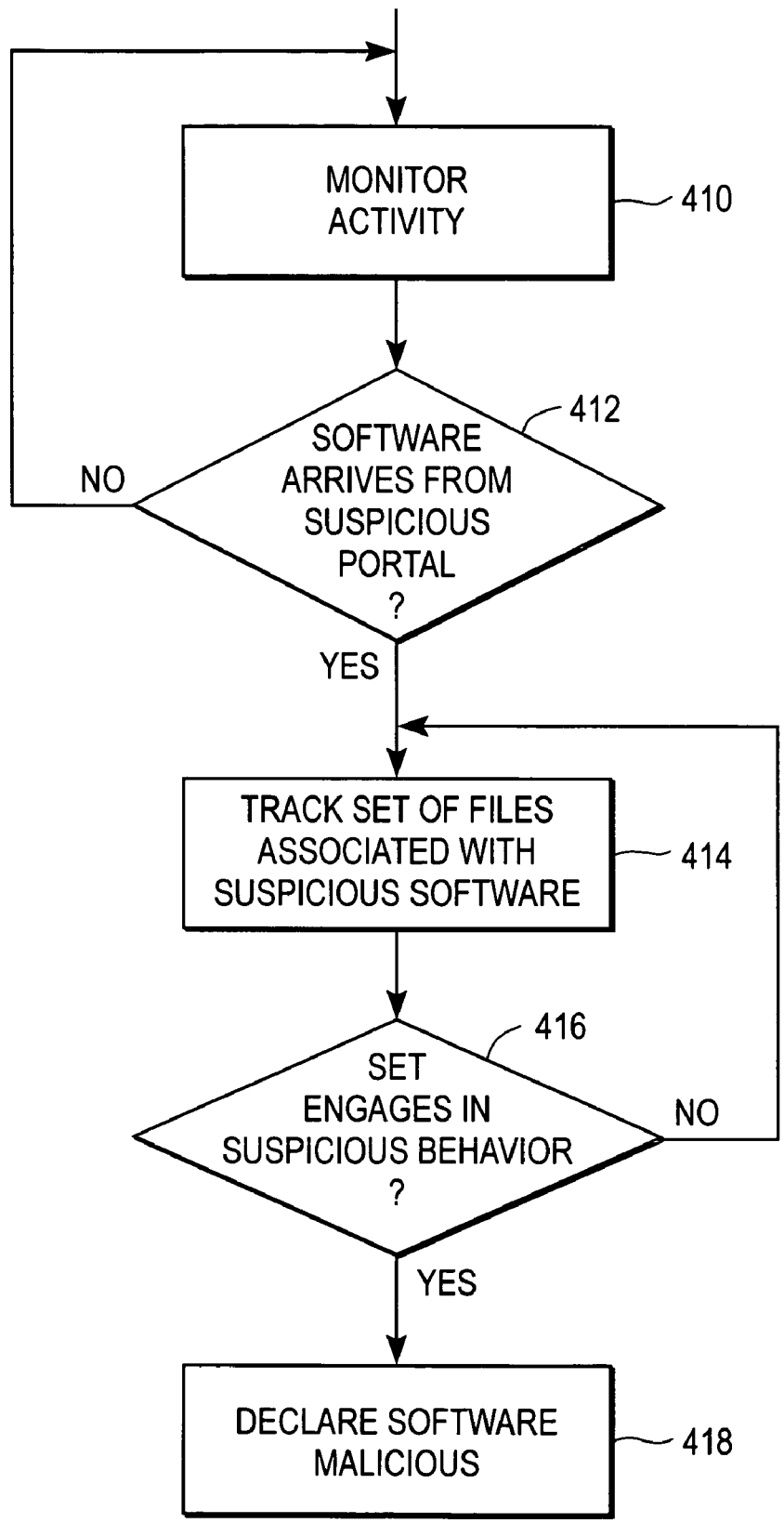
FIG. 4 is a flowchart illustrating steps performed by the MSDM to detect malicious software according to one embodiment.

FIG. 4 is a flowchart illustrating steps performed by the MSDM 212 to detect malicious software according to one embodiment. It should be understood that these steps are illustrative only, and that other embodiments of the present invention may perform different and/or additional steps than those described herein in order to perform different and/or additional tasks. Furthermore, the steps can be performed in different orders than the one described herein The MSDM 212 monitors 410 activity on the local storage device 108. The MSDM 212 detects when new software arrives on the storage device 108, and it detects the portal through which the software arrived. If 412 the software arrived through a portal designated as suspicious, the MSDM 212 designates the software itself as suspicious.

The MSDM 212 tracks 414 the files on the local storage device 108 (or elsewhere within the computer system 100) that are associated with the suspicious software. In one embodiment, the MSDM 212 creates a logical set of files associated with the suspicious software. The set contains the files that form the suspicious software and any file that is touched by a file already in the set.

If the files in the set either individually or collectively engage in behavior indicating that the software is malicious, in one embodiment the MSDM 212 declares 418 that the software is malicious and notifies the end-user, quarantines the software, blocks the software from performing certain activities, and/or performs other actions. If the files in the set do not engage in behavior indicating the software is malicious, the MSDM 212 continues to track 414 the file set.

The flowchart of FIG. 4 illustrates the steps followed by one embodiment of the MSDM 212 in monitoring one piece of suspicious software. Those of skill in the art will recognize that the MSDM 212 can monitor multiple sets of suspicious software simultaneously. Thus, the MSDM 212 can execute different steps of the flowchart simultaneously.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for detecting malicious software on a computer system, comprising:
   a computer-readable storage medium having computer executable program code recorded thereon comprising:
   a suspicious software module for detecting suspicious software on the computer system;
   a tracking module for identifying a set of files on the computer system associated with the suspicious software and adding to the set a file touched by a file already in the set; and
   a behavior monitoring module for monitoring the files in the set to determine whether the suspicious software is malicious.

2. The system of claim 1, wherein the suspicious software module determines a portal through which software arrives on the computer system, and wherein software arriving through certain portals is designated as suspicious.

3. The system of claim 1, wherein the tracking module adds to the set a file created and/or modified by a file already in the set.

4. The system of claim 1, wherein the tracking module adds to the set a file created and/or modified by a program caused to be executed by a file in the set.

5. The system of claim 1, wherein the behavior monitoring module utilizes one or more heuristics to detect whether the set of files is malicious.

6. The system of claim 5, wherein a heuristic specifies a condition that is satisfied if the files in the set collectively satisfy the condition.

7. The system of claim 5, wherein a heuristic specifies that suspicious software is malicious if a file in the set associated with the suspicious software copies any file in the set to another computer system.

8. A method for detecting malicious software on a computer system, comprising:
   detecting suspicious software on the computer system;
   identifying a set of files on the computer system associated with the suspicious software and adding to the set a file touched by a file already in the set; and
   monitoring the files in the set to determine whether the suspicious software is malicious.

9. The method of claim 8, wherein detecting suspicious software comprises:
   determining a portal through which the software arrives;
   determining whether the portal is suspicious; and
   responsive to a determination that the portal is suspicious, declaring the software suspicious.

10. The method of claim 8, wherein identifying a set of files on the computer system associated with the suspicious software comprises:

adding to the set a file created and, or modified by a file already in the set.

11. The method of claim 8, wherein identifying a set of files on the computer system associated with the suspicious software comprises:

adding to the set a file created and/or modified by a program caused to be executed by a file in the set.

12. The method of claim 8, wherein monitoring the files in the set comprises:

determining whether the files in the set behave in a manner satisfying one or more conditions of one or more heuristics.

13. The method of claim 12, wherein a condition of a heuristic is satisfied if the files in the set collectively satisfy the condition.

14. The method of claim 12, wherein a heuristic specifies that suspicious software is malicious if a file in the set associated with the suspicious software copies any file in the set to another computer system.

15. A computer-readable storage medium storing computer executable program code for detecting malicious software on a computer system, the program code comprising:

a suspicious software module for detecting suspicious software on the computer system;

a tracking module for identifying a set of files on the computer system associated with the suspicious software and adding to the set a file touched by a file already in the set; and a behavior monitoring module for monitoring the files in the set to determine whether the suspicious software is malicious.

16. The computer-readable storage medium of claim 15, wherein the suspicious software module determines a portal through which software arrives on the computer system, and wherein software arriving through certain portals is designated as suspicious.

17. The computer-readable storage medium of claim 15, wherein the tracking module adds to the set a file created and/or modified by a file already in the set.

18. The computer-readable storage medium of claim 15, wherein the tracking module adds to the set a file created and/or modified by a program caused to be executed by a file in the set.

19. The computer-readable storage medium of claim 15, wherein the behavior monitoring module utilizes one or more heuristics to detect whether the set of files is malicious.

20. The computer-readable storage medium of claim 19, wherein a heuristic specifies a condition that is satisfied if the files in the set collectively satisfy the condition.

21. The computer-readable storage medium of claim 19, wherein a heuristic specifies that suspicious software is malicious if a file in the set associated with the suspicious software copies any file in the set to another computer system.

* * * * *